Patented June 11, 1929.

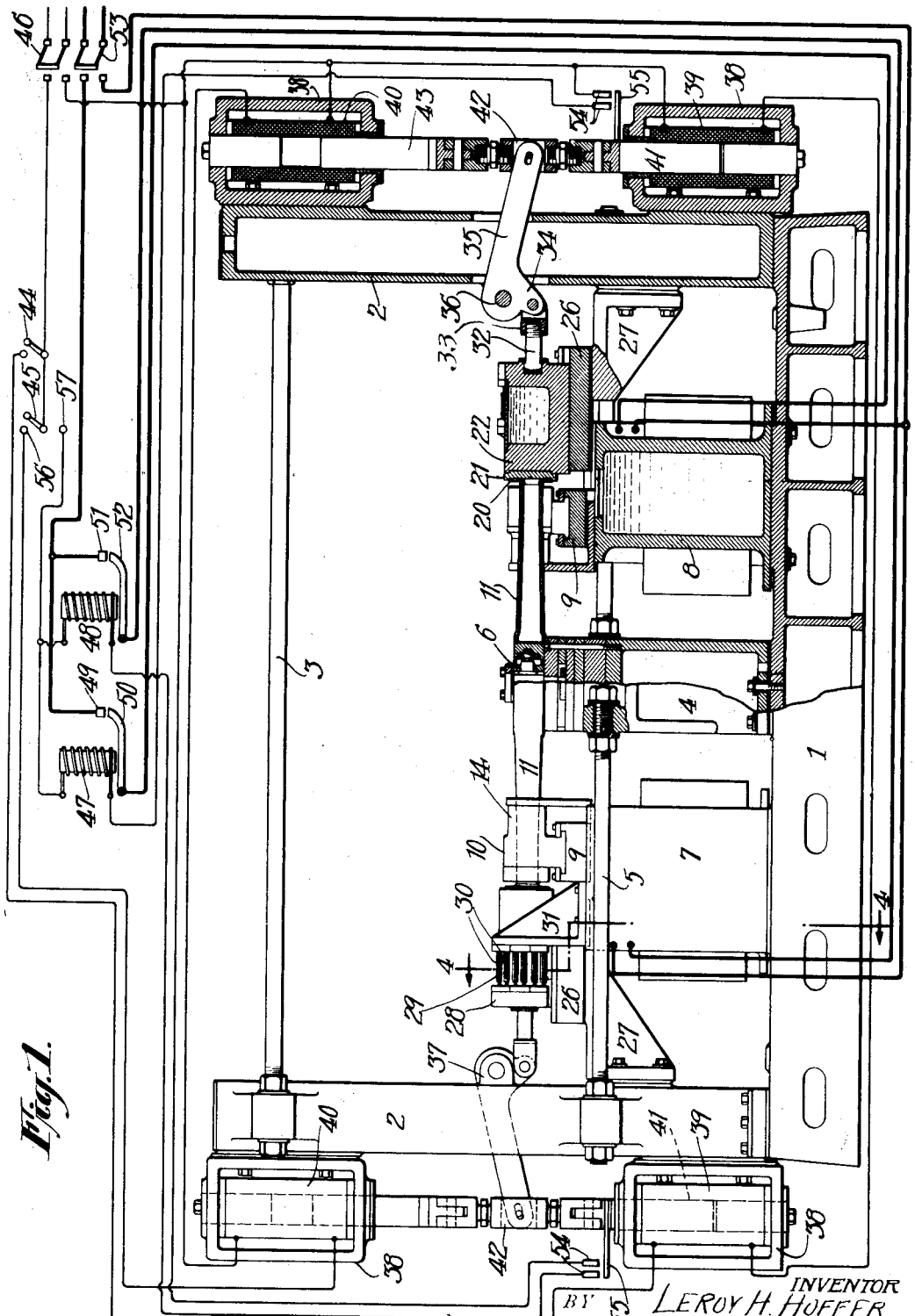

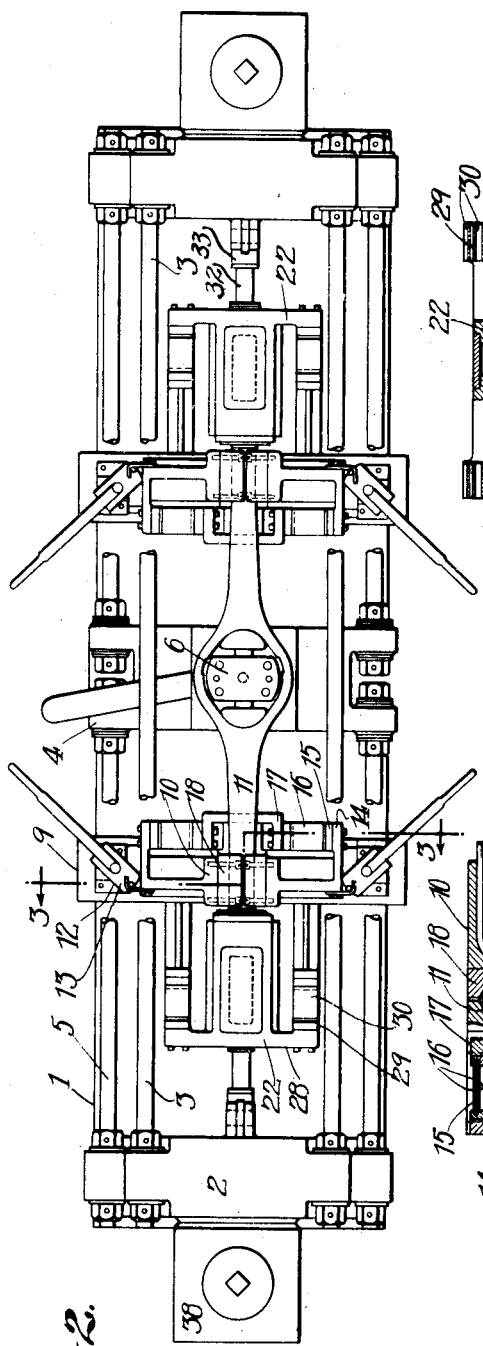
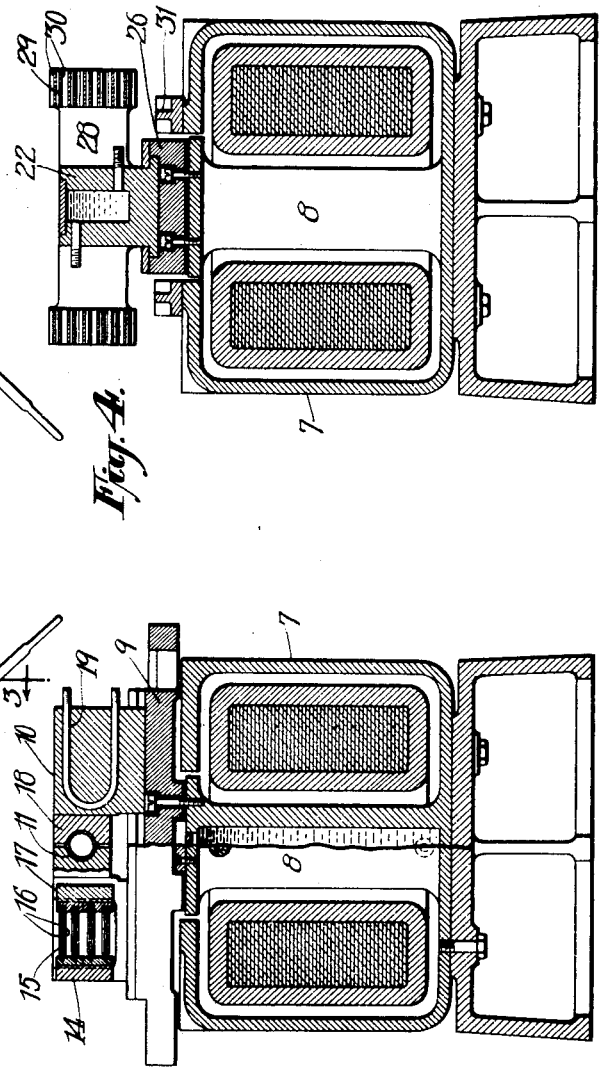

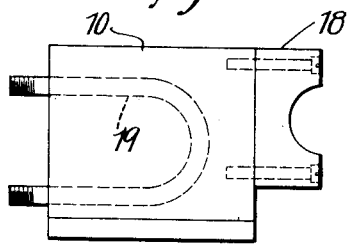
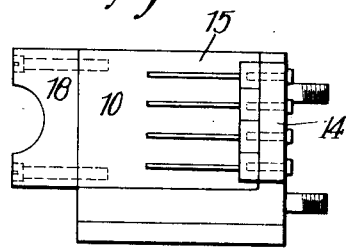
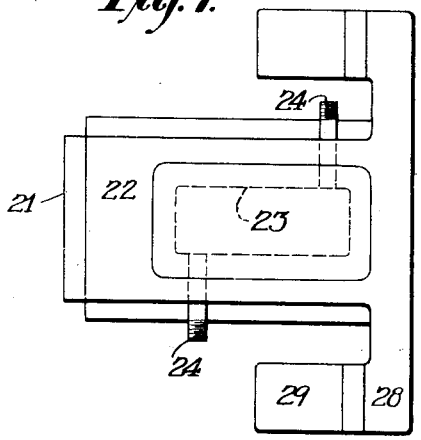
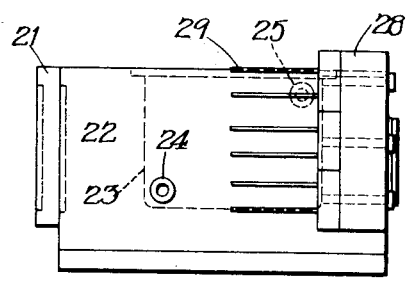
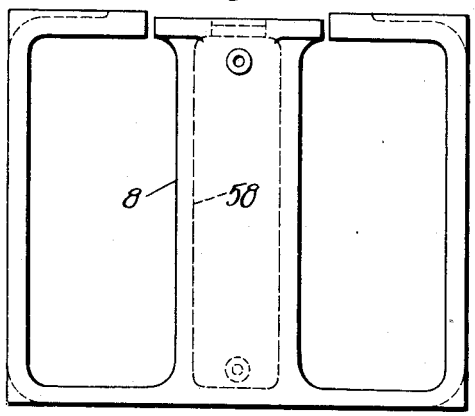
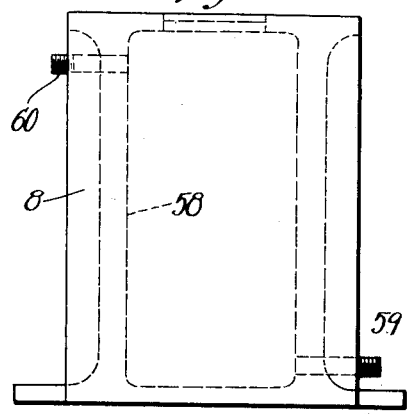

1,716,442

UNITED STATES PATENT OFFICE.

LE ROY H. HOFFER, OF BROOKLYN, NEW YORK, ASSIGNOR TO THOMAS E. MURRAY, OF BROOKLYN, NEW YORK.

ELECTRIC WELDING MACHINE.

Application filed April 10, 1924. Serial No. 705,419.

My invention aims to provide an improved machine for performing welding operations and particularly for use in the making of sheet metal articles which require a plurality of butt welding operations. In the example illustrated the machine is designed to apply flanges at opposite ends of an automobile rear axle.

Fig. 1 is partly a longitudinal side elevation and partly a section of the complete machine;

Fig. 2 is a plan, partly broken away;

Fig. 3 is a vertical section on the line 3—3 of Fig. 2;

Fig. 4 is a vertical section on the line 4—4 of Fig. 1;

Fig. 5 is a side elevation of one of the clamping electrodes;

Fig. 6 is an opposite side elevation of the same;

Fig. 7 is a plan, and Fig. 8 a side elevation of one of the end electrodes;

Fig. 9 is a front elevation and Fig. 10 a side elevation of one of the transformer cores.

Referring to the embodiment of the invention illustrated, the machine is provided with two sets of welding electrodes, with a separate transformer for each set and also a separate pressing mechanism for each set, a single work-piece, being held by a central chuck, with the welding mechanisms at opposite ends of the work. It is arranged to weld the two end plates or flanges on a differential housing or rear axle at the same time. The positions of the electrodes, solenoids and connected parts illustrated are those which exist at the completion of a weld.

Upon the bed 1 are upright standards 2 connected near the top by tie rods 3. In the centre, fastened to and insulated from the bed 1, is a casting 4 connected by insulated tie rods 5 to the posts 2. On the centre casting 4 there is mounted an internal chuck 6 to hold the housing at the centre. Between the centre casting and the upright standards are transformers 7, the cores 8 of which are fastened to the bed of the machine.

Mounted on each transformer are two slides 9 in which clamping electrodes 10 slide transversely so as to clamp between them an end of the work 11, the electrodes 10 being forced inward by hand operated cams 12 which carry pins engaging hooks 13 for withdrawing the electrodes. The electrodes at their rear ends have lateral arms 14 which carry inwardly projecting switch blades 15 which in the clamped welding position engage switch blades 16 carried by a bracket 17 which is mounted on the transformer and connected to a terminal thereof. On its face each of these electrodes has a block 18 recessed for direct engagement and clamping of the work, and its body portion is water cooled as by means of a U-shaped pipe 19 cast in the electrode at the foundry. The outer and inner face views of one of these electrodes are shown separately in Figs. 5 and 6.

The purpose of the machine is to apply to opposite ends of the axle 11 end plates 20. These are provided with a central opening around which is a flange which is brought to abut against the ends of the axle 11, the edges being pressed together while the current is passed across the joint. Preferably the Murray method of welding is used, which consists in passing a current of extraordinarily high amperage for a very brief period of time. Each end plate is held in place by a suitably shaped block 21, on the end of an electrode 22 (Figs. 7 and 8) which is water cooled by means of a central recess 23 and pipes 24 and 25 for circulating water therethrough. Each of these moving electrodes is mounted to slide longitudinally on a plate 26 (Fig. 1) which is supported on a bracket 27 and by the transformer and insulated therefrom. The electrode has at opposite sides lateral arms 28 which carry switch blades 29 which in the advanced position of the electrode engage blades 30 carried in pairs on brackets 31 mounted on the top of the transformer and connected with one of its terminals. The provision of a number of switch blades along the sides of the moving electrode serves to equalize the distribution of the current to different parts of the electrode and around the end plate. Similarly the provision of a number of switch blades across the width of the clamping electrodes tends to equalize the distribution of current from top to bottom of the end blocks 18 thereof, and around the circumference of the work. This is of particular importance where the period of current application is extremely short.

Each of the moving electrodes is connected at its rear end to a link 32 the opposite end of which is screwed into a block 33 which is forked and pivoted on a short arm 34 on a lever 35 pivoted about a pin 36 mounted in brackets 37 carried by the posts 2. When the outer ends of the arms 35 are pressed down, the end plates 20 are forced against the ends of the axle 11 and the secondary circuits of the transformers are completed at each end of the work from the electrode 22 through the joint to the clamping electrodes 10.

On the upright standards 2 are fastened frames 38 in which are the pressure solenoids 39 and the lifting solenoids 40. Each of the pressure solenoids 39 has a plunger 41 connected to a slotted link 42 which is connected at its opposite end to the plunger 43 of the lifting solenoid 40. The lever 35 at each end of the machine has its outer end connected to the link 42 by means of a pin and slot.

A suitable electric control apparatus is indicated diagrammatically in Fig. 1. The single-throw switch 44 controls the line leading to the pressure solenoids 39. The single-pole double-throw switch 45 controls the circuit to the lifting solenoids 40. These are on a direct current line which is connected to the outside mains by a supply switch 46. Direct current wires are indicated by light lines, and alternating current by heavy lines. Contactors 47 and 48 of standard railway design are controlled by the direct current and serve to close contacts 49 and 50, and 51 and 52 respectively. The alternating current supply from the mains is through a switch 53. At each end of the machine the fixed contacts 54 are in the line of travel of a bridge or finger 55 which is attached to the core 41 of the pressure solenoid and moves with the link 42; closing the contacts when the link is lifted to the desired limit.

The operation of the machine is as follows: The supply or feed switches 46 and 53 are closed. The switch 45 is thrown upward to contact with the terminal 56, which energizes the lifting solenoids 40. This lifts the link 42 which pulls the moving electrodes 22 outward. The lifting of the links also brings the fingers 55 up to bridge the contacts 54. The axle housing and end plates are then put in position and the clamping electrodes 10 pressed inward about the ends of the housing. The switch 45 is then opened and the switch 44 closed, energizing the pressure solenoids. Switch 45 is then closed downward on the terminal 57, thus energizing the solenoids of the contactors 47 and 48 and closing the primary circuit through the welding transformers and causing the welding current to flow through the secondary and through the electrodes. At this time the fingers 55 are in engagement with the side of the contacts 54 (over which they slide) at a certain distance above the lower ends of the contacts. The first effect is to press the electrodes 22 forward against the work. As the metal becomes heated the pressure solenoids 39 continue to pull down the links 42 and to advance the electrodes 22. At a predetermined point the fingers 55 pass beyond the ends of the contacts 54, breaking the circuits through the solenoids of the contactors 47 and 48 and opening their contacts and breaking the primary circuits of the transformers.

The pressure on the work may be continued while it is cooling after the welding current is off. Finally the switch 44 is opened to relieve the pressure and the switch 45 is closed on the contact 56 to lift the links 42 and to pull back the end electrodes. The completed housing is then taken out and a new one introduced for the next cycle of operation.

The core of the transformer is indicated in Figs. 9 and 10 with a central chamber 58 through which water is circulated by means of pipes 59 and 60 in order to keep it cool.

It is to be noted that there are two transformers, two sets of electrodes and two pressure solenoids each acting independently. More than two such welding mechanisms may be provided, according to the number of welds to be made on a single piece of work, or at each operation of the machine. The independence of the two mechanisms ensures that each weld will be complete and that the designed take-up of metal will be effected at each joint before the welding current is cut off. Thus, by reason of inequalities in the metal at opposite ends of the work, one weld may require an instant longer than the other. Thus the termination of the welding operations is independently controlled by the condition of the work. The circuits are closed by a common means for the two sets of electrodes, but are opened separately, for the right-hand electrodes by the right-hand terminals 54, 55, and for the left-hand electrodes by the left-hand terminals 54, 55. Each transformer has a separate primary circuit, one controlled by the contacts 49 and 50 and the other by the contacts 51 and 52; both these primary circuits being controlled to the extent of starting the welding operation by the common switch 45, and each being controlled separately to the extent of stopping the welding operation by its own pair of contacts 54, 55.

For the same reason, the independence of the mechanisms as described, they may be made to perform two different operations, one of them having its contacts 54 longer than the other to ensure a longer take-up, and having differently shaped clamping and moving electrodes according to the shape of the work, and different designs of transformers and electrodes according to the current requirements. Also the solenoids for moving the parts may be replaced by other motors, such for example as springs or counterweights for withdrawing the moving electrodes.

As shown in Figs. 3 and 4 the supports for the clamping or stationary electrodes and for the moving electrodes are insulated from the secondary of the transformer. This permits the making of the supporting plates and the sliding bearings of steel or brass, which has a better wearing quality than copper. The electrodes themselves will generally be of copper.

Any one of many well known methods of controlling the welding current can be used instead of that described above. The machine can also be arranged to weld one end first and the other immediately after, thereby cutting in half the current required. Thus it would require only the same current as a single welding machine. It would operate more quickly than two machines because it would require only one chucking or mounting of the work in the machine.

Though I have described with great particularity of detail certain embodiments of my invention yet it is not to be understood therefrom that the invention is restricted to the particular embodiments disclosed. Various modifications may be made by those skilled in the art without departing from the invention as defined in the following claims.

What I claim is:—

1. A welding machine comprising a plurality of sets of welding electrodes, means for pressing the electrodes of each set together with the work between them, a common means for closing simultaneously the circuits of the different sets, and separate means for breaking said circuits independently.

2. A welding machine comprising a plurality of sets of welding electrodes with a separate pressing mechanism for pressing the electrodes of each set together with the work between them, a common electric control for closing simultaneously the circuits of the different sets and separate means controlled by said pressing mechanisms for breaking said circuits independently.

3. A welding machine comprising a plurality of welding mechanisms each including opposite electrodes between which the work is clamped, a common means for starting welding operations simultaneously by the different welding mechanisms, and separate means adapted to terminate such welding operations at different times.

4. A welding machine comprising a plurality of welding mechanisms each including opposite electrodes between which the work is clamped, and means for starting them at the same time and for stopping them independently.

5. A plurality of welding mechanisms including independent transformers with a limit switch for each and a common means for closing the primary circuits of said transformers simultaneously and maintaining each of them closed for a period determined independently by its limit switch.

6. A welding machine comprising a plurality of welding devices with a separate electrically operated pressing mechanism for each, said pressing mechanisms being actuated by a common switch and the welding current for said welding devices being also controlled by a common switch.

7. A welding machine for applying plates to opposite ends of an axle housing, comprising a chuck adapted to engage the central part of the housing, leaving its ends free, two pairs of transversely moving electrodes each pair adapted to clamp and hold one of the end portions of the housing in position for application of the end plates and two longitudinally moving electrodes each adapted to press an end plate against and weld it to an end of the housing.

In witness whereof, I have hereunto signed my name.

LE ROY H. HOFFER.